United States Patent [19]

Adams et al.

[11] Patent Number: 5,037,322

[45] Date of Patent: Aug. 6, 1991

[54] PLUG-IN CONNECTION FOR THE ELECTRICAL INTERROGATION OF DATA OF A WHEEL REVOLUTION COUNTER

[75] Inventors: Jürgen Adams; Thomas Riester, both of Villingen-Schwenningen, Fed. Rep. of Germany

[73] Assignee: Mannesmann Kienzle GmbH, Villingen-Schwenningen, Fed. Rep. of Germany

[21] Appl. No.: 447,164

[22] Filed: Dec. 7, 1989

[30] Foreign Application Priority Data

Dec. 9, 1988 [DE] Fed. Rep. of Germany ....... 3841509

[51] Int. Cl.⁵ .......................................... H01R 13/627
[52] U.S. Cl. ..................................... 439/357; 439/21; 439/387; 439/660; 235/103
[58] Field of Search ...................... 235/95 B, 95 R, 97, 235/103; 439/13, 16, 21, 22, 27, 29, 34, 320, 357, 387, 436, 660, 829

[56] References Cited

U.S. PATENT DOCUMENTS

| | | |
|---|---|---|
| 3,198,430 | 8/1965 | Hermann ............................... 235/103 |
| 3,439,307 | 4/1969 | Ruscher ................................ 439/21 |
| 3,808,577 | 4/1974 | Mathauser . | |
| 4,560,223 | 12/1985 | Cooney et al. ...................... 439/387 |
| 4,699,592 | 10/1987 | Gallo et al. ........................... 439/27 |
| 4,715,828 | 12/1987 | Landrevie .......................... 439/660 |
| 4,773,866 | 9/1988 | Basques .............................. 439/22 X |

FOREIGN PATENT DOCUMENTS

| | | |
|---|---|---|
| 3244832 | 6/1984 | Fed. Rep. of Germany . |
| 3310208 | 10/1984 | Fed. Rep. of Germany . |
| 807744 | 1/1959 | United Kingdom . |
| 1084283 | 9/1967 | United Kingdom . |
| 1385330 | 2/1975 | United Kingdom . |
| 2169158 | 7/1986 | United Kingdom . |

*Primary Examiner*—Neil Abrams
*Assistant Examiner*—Khiem Nguyen
*Attorney, Agent, or Firm*—Toren, McGeady & Associates

[57] ABSTRACT

The proposed plug-in connection provides that the wheel revolution counter itself or its free end, respectively, are constructed as a plug-in connection part with exposed contact paths, the wheel revolution counter being fastened e.g. at a rim of a vehicle wheel, and the counterpart of the plug-in connection provided e.g. in a hand-held device serving for the data take-over. Reciprocally acting catch members and the contacts which latter are assigned to one another, are constructed in such a way that it is possible to connect the wheel revolution counter and data take-over device regardless of position and in such a way that a reciprocal rotation is enabled which serves for making contact.

10 Claims, 2 Drawing Sheets

5,037,322

PLUG-IN CONNECTION FOR THE ELECTRICAL INTERROGATION OF DATA OF A WHEEL REVOLUTION COUNTER

BACKGROUND OF THE INVENTION

The invention is directed to a plug-in connection for electrical interrogation or retrieval of data from a mileage counter of a wheel revolution counter type by means of a device serving to accept the data of a wheel revolution counter, wherein the wheel revolution counter is equipped with a substantially cylindrical housing, a revolution storage and at least a counter storage, and means for overhung fastening of the wheel revolution counter are provided at one end of the housing.

If the distances traveled by motor vehicles, trailers and semi-trailers are to be detected in an extensively tamper-proof manner, e.g. because these vehicles will be taxed according to the mileage, it is conventional to use so-called wheel revolution counters as mileage counters. These wheel revolution counters are attached directly to the axle cap or the wheel hub of the respective vehicles and accordingly require neither flexible shafts nor electrical cables for the transmission of the measured values. Since mileage counters of this type revolve with the vehicle wheel to which they are assigned, it is necessary to provide a comparison speed of zero for the counting process, which is usually effected by means of a pendulum.

In general, wheel revolution counters are constructed as printing wheel-revolution counters, since a record of the data removal and accordingly a printing of a record is required in the event that the mileage is taxed. Of course, it can also be advisable to produce such a printed record for checking maintenance intervals, for monitoring wear, for producing shipping calculations or for determining the distance travelled of rented vehicles.

In order to be able to assign the current mileage reading to the respective vehicle, it is required, in addition, to print out a device or identification number, i.e. a fixed set of number type which can be appointed to a vehicle prior to the installation of the wheel revolution counter must be provided in addition to a print wheel set which is driveable as a function of the mileage.

Accordingly, in contrast to wheel revolution counters which display exclusively, considerably more construction space is required in the case of a printing wheel-revolution counter. In the case of wheel revolution counters which are also conceived for use in passenger cars, this space requirement leads to considerable problems with respect to manufacturing and assembly due to the required extreme packing density. This packing density is brought about by the efforts to achieve a suitably adapted aesthetic structural form having a housing diameter of approximately 50 mm and an overall height which should not exceed, or should exceed only slightly, the side contours of the vehicle, in view of the risk of collision.

Moreover, in printing wheel-revolution counters, there is the problem that the access to the insertion slot for the printed record must be opened for a print out and accordingly there is a risk of penetration of dirt and corrosion in addition to the risk of tampering. In any event, a hermetic sealing of the wheel revolution counter, which would be desirable for severe use conditions, is not possible. Such a device requires a high degree of subjective care during the removal of data as well as when being subsequently closed so as to be at least tight against moisture.

Given this situation, a wheel revolution counter which can be electrically interrogated would offer advantages, especially since recently the functioning of electrical components in the given temperature range is ensured and technical means for securing the data transmission are known.

SUMMARY OF THE INVENTION

Accordingly, it is an object of the present invention to provide a plug-in connection between a wheel revolution counter, which can be electrically interrogated, and a device taking over the data of the wheel revolution counter, which plug-in connection has a small space requirement with respect to the wheel revolution counter, ensures easy handling and is extensively impervious to the penetration of dirt.

Pursuant to this object, and others which will become apparent hereafter, one aspect of the present invention resides in assigning the interfaces for the electrical connections of the wheel revolution counter with the data take-over device to an end of the wheel revolution counter remote from the end fastening the counter to the wheel. Additionally, at least two interfaces are provided, at least one of which is constructed as a self-enclosed contact path, and means for holding the part of the plug-in connection located on the side of the data take-over device are formed on at the circumference of the housing of the wheel revolution counter.

In a preferred embodiment a circumferentially extending groove is formed at the circumference of the housing of the wheel revolution counter, and the part of the plug-in connection to be connected with the wheel revolution counter has a cylindrical depression corresponding to the diameter of the wheel revolution counter. Catch elements assigned to the groove of the wheel revolution counter are formed at the depression wall, and springing contacts are provided which project into the depression.

The technical significance of the invention consists particularly in that the wheel revolution counter itself is constructed as a hermetically closed plug-in connection part. Since the wheel revolution counter is constructed so as to have an extensively smooth surface and because of the external contacts, the plug-in connection requires no constructional space for a plug inside the wheel revolution counter on the one hand, and, on the other hand, the plug-in connection is not susceptible to the penetration of dirt, i.e. the problems relating to the penetration of dirt, which are unavoidable in the environment in which the wheel revolution counter is used and which make the external contacts seem inadvisable at first, are substantially reduced with the discovered solution. The selection of the transmission method, namely a serial data transmission method in connection with a suitable data transmission monitoring which requires a minimum of contacts, also serves this purpose, aside from improving the resistance to tampering. In contrast, optical transmission means are relatively unsuitable for the given application, particularly because of the narrow temperature range and the effects of dirt which can not be easily overcome. Additionally, inductive or capacitive transmission means are relatively unsuitable because of their susceptibility to electrical and magnetic fields as well as the higher expenditure for circuitry.

In addition, the handling of the plug-in connection, according to the invention, is particularly simple in that the part to be handled has a structural form which is easy to handle and can also be connected with the wheel revolution counter regardless of position. Damage during the coupling of the plug-in connection parts due to insufficient subjective care is also ruled out. Further, the part of the plug-in connection to be handled sits securely and an increased protection against tampering is achieved by means of the encompassing of the wheel revolution counter, i.e. its support along a relatively large diameter. In this connection, a solution in which the data take-over device is constructed as a hand-held device which is directly connectable with the wheel revolution counter is particularly advantageous.

The provided structural form allows the plugged in connection part to be rotated after the mechanical coupling of the plug-in connection and, in this manner, dirt can be shaved off the contacts and a secure contact can be made. In order that the contact paths can be effectively shaved off or shaved free and the springing contacts can be prevented from sliding on the dirt film, it is advantageous to construct the contacts cooperating with the contact paths e.g. in a wedge-shaped manner or to provide them with an annular cutting edge. The contacts formed at the wheel revolution counter can accordingly be arranged in an open, i.e., unprotected manner, which results in a considerable minimizing of costs.

The static current which flows when supply voltage is applied and which may not fall below a fixed minimum value before the transmission of data is effected is used for the purpose of checking whether or not contact has actually been made with the required efficiency after the plug-in connection is assembled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
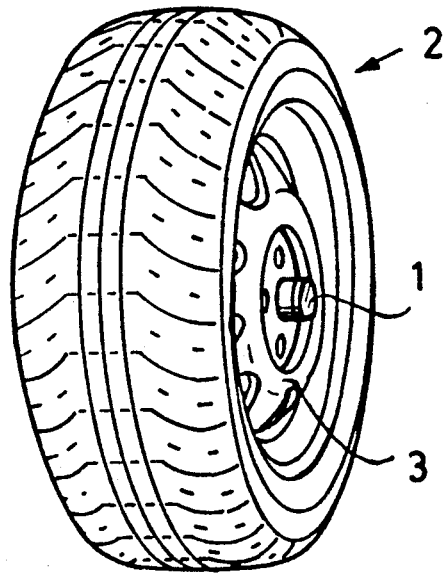
FIG. 1 shows a vehicle wheel with a wheel revolution counter assigned to it.

FIG. 1 substantially illustrates the ratios of dimension of various components. A wheel revolution counter 1 is assigned in FIG. 1 to a passenger vehicle wheel 2, i.e. it is arranged so as to project at the vehicle wheel 2 by means of suitable receiving means which are fastened in turn at the rim 3.

Figure 2:
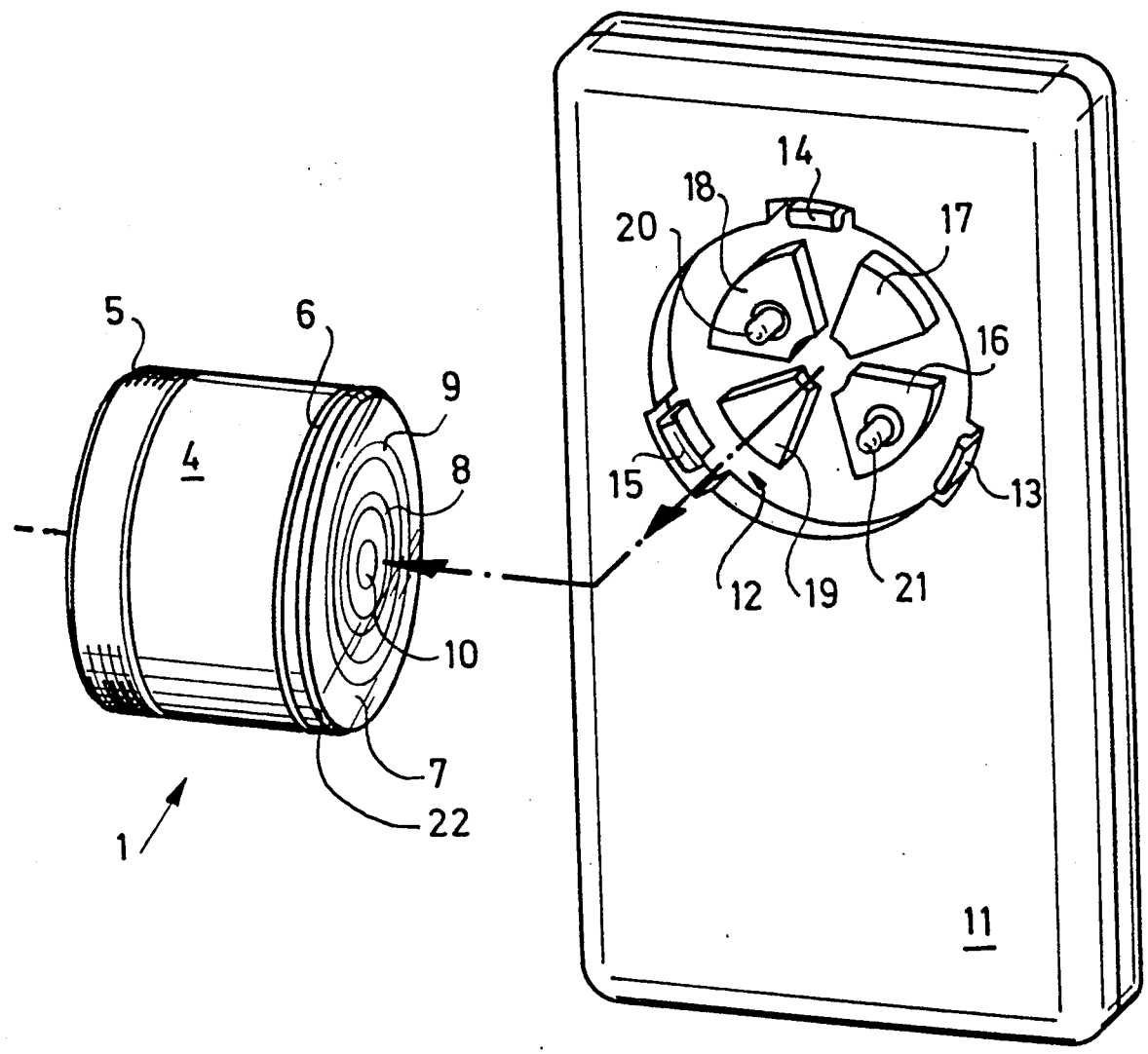
FIG. 2 shows a perspective view of the wheel revolution counter according to FIG. 1 and data take-over device to be connected with the wheel revolution counter.

According to the embodiment of the wheel revolution counter 1 shown in FIG. 2, a thread 5 is formed at the circumference of a housing 4, which thread 5 serves for the connection with the receiving means. A groove 6 is formed circumferentially at the end of the wheel revolution counter 1 remote from the thread 5, and two contact paths 8 and 9 are constructed at the flat front side 7. A seal 10 is arranged in a countersunk manner in the front side 7 and secures, for example, a screw which serves to open the wheel revolution counter 1.

A hand-held device 11 serves for the data take-over and comprises at least operator's controls and e.g. a display at the front, but also comprises a depression 12 at its rear side whose opening diameter corresponds to the outer diameter of the wheel revolution counter 1. Catch hooks 13, 14 and 15, which are assigned to the groove 6, are recessed inside the depression 12. The groove 6 and the catch hooks 13, 14, 15 preferably conform to one another with respect to shape so that they exert an axial tensile force on the data take-over device 11 when they are engaged.

Projections 16, 17, 18, 19 are formed at the base of the depression 12 and act, in their entirety, as a stop when the data take-over device 11 is placed on the wheel revolution counter 1. The cut out portions, which are provided between the individual projections and are not shown in more detail, serve, on the one hand, for the secure contact of the data take-over device 11 at the end face 7 of the wheel revolution counter 1 and, on the other hand, for receiving the dirt residues which are shaved off when the wheel revolution counter 1 and data take-over device 11 are rotated reciprocally for producing a contact of the end face 7 sufficient for data transmission. Springing contacts 20, 21 are arranged in the depression 12 and cooperate with the contact paths 8 and 9. A bevel 22 formed on at the wheel revolution counter 1 serves to center the data take-over device 11 in a reliable manner. In order to improve contact at the end face 7 on the one hand and to optimize the shaving effect of the radial edges of the projections 16, 17, 18, 19 on the other hand, it is advisable to construct the end faces of the projections 16, 17, 18, 19 in a concave manner, so that substantially only the contacts 20, 21 and the radial edges of the projections 16, 17, 18, 19 contact the end face 7 of the wheel revolution counter 1 when the data take-over device 11 is coupled with the wheel revolution counter 1.

Figure 3:
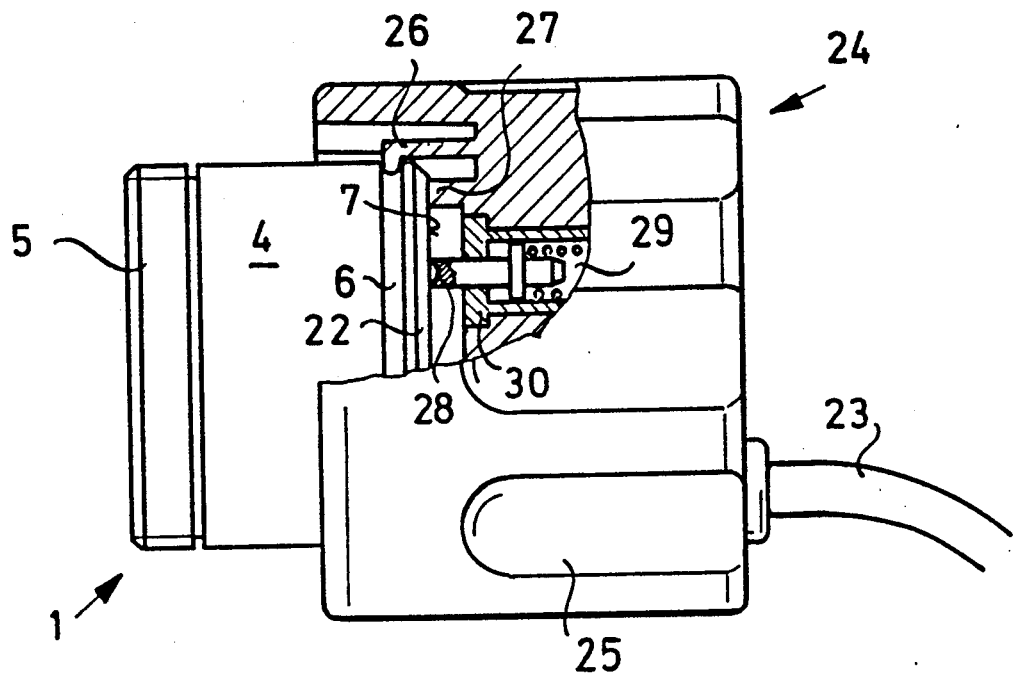
FIG. 3 shows a side view of the wheel revolution counter with a partial section of a plug which is connected with a data take-over device, not shown in FIG. 3, via cable.

FIG. 3 shows an arrangement in which a data take-over device, which is not shown and can be arranged e.g. so as to be stationary, communicates with the wheel revolution counter 1 by means of a cable 23 and a plug 24. The plug 24 is provided with gripping recesses 25 for better handling, likewise comprises catch hooks 26 with relatively high spring rigidity, and, in contrast to the construction at the data take-over device 11, encompasses the wheel revolution counter 1 along a relatively large length, so that a secure, relatively fixed seat is achieved when the fit is suitably selected.

A collar 27 serves as a stop at the end face 7. The contact pins, one of which— 28— is shown, are not provided with conventional lens-shaped caps but rather are provided with annular cutting edges, not described in more detail, and they are acted upon by springs 29 and are guided in contact sleeves 30. Of course, the same design of the contacts and the stop means can be selected for the plug 24 as those realized in the data take-over device 11, and vice versa.

With respect to the contact, it is conceivable to include the housing of the wheel revolution counter 1 in the electric circuit, to provide segmented contact paths or to assign a centrally arranged contact to a contact path. Further, the contact paths can be arranged on an insulating plate, which can be connected with the housing of the wheel revolution counter 1, or the contact paths are cut into the housing 4 so as to be insulated in a suitable manner, the housing 4 being conductive per se. However, an insulating housing made of suitable plastic be used for the housing 4 of the wheel revolution counter 1 can also be used.

Further, the contact paths can be arranged at the circumference of the housing 4, wherein the overall depth of the wheel revolution counter 1 can be limited to a minimum.

While the invention has been illustrated and described as embodied in a plug-in connection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by letters patent is set forth in the appended claims.

We claim:

1. A plug-in connection for the electrical interrogation of data from a wheel revolution counter type mileage counter by means of a device for taking over the data of the wheel revolution counter, the connection comprising a wheel revolution counter having a substantially cylindrical housing, a revolution storage and at least a counting storage, one end of the housing being provided with means for fastening the wheel revolution counter so that it projects from a wheel; at least two interfaces for electrical connections of the wheel revolution counter with the data take-over device, assigned to an end of the wheel revolution counter remote of the one end thereof, the at least two interfaces including at least one constructed as a self-enclosed contact path; and means for holding a part of the plug-in connection located on the data take-over device, the holding means being formed on at the circumference of the housing of the wheel revolution counter.

2. A plug-in connection according to claim 1, wherein the housing of the wheel revolution counter has a substantially smooth surface at the circumference at the end remote from the one end fastening the counter.

3. A plug-in connection according to claim 1, wherein at least one circular contact path is arranged at a front side of the wheel revolution counter.

4. A plug-in connection according to claim 1, wherein at least one circular contact path is arranged at the circumference of the wheel revolution counter.

5. A plug-in connection according to claim 1, wherein a circumferentially extending groove is formed in the housing of the wheel revolution counter at the circumference thereof.

6. A plug-in connection according to claim 1, wherein a part of the plug-in connection to be connected with the wheel revolution counter includes a cylindrical depression corresponding to the diameter of the wheel revolution counter, catch elements assigned to the groove of the wheel revolution counter and constructed at a wall of the depression, and springing contacts provided so as to project into the depression.

7. A plug-in connection according to claim 6, wherein contact pins are provided and are supported in a springing manner in the base of the depression.

8. A plug-in connection according to claim 1, wherein the part of the plug-in connection to be connected with the wheel revolution counter is constructed in a housing of the data take-over device.

9. A plug-in connection according to claim 1, wherein a cam groove for a bayonet-type connection for securing the plug-in connection is provided at the circumference housing of the wheel revolution counter.

10. A plug-in connection according to claim 1, including means, provided at the part of the plug-in connection to be connected with the wheel revolution counter, for exerting a shaving effect at external contact paths of the wheel revolution counter when components of the plug-in connection are rotated relative to one another.

* * * * *